United States Patent [19]

Dvorkis

[11] Patent Number: 5,477,043
[45] Date of Patent: Dec. 19, 1995

[54] SCANNING ARRANGEMENT FOR THE IMPLEMENTATION OF SCANNING PATTERNS OVER INDICIA BY DRIVING THE SCANNING ELEMENTS IN DIFFERENT COMPONENT DIRECTIONS

[75] Inventor: Paul Dvorkis, Stony Brook, N.Y.

[73] Assignee: Symbol Technologies, Inc., Bohemia, N.Y.

[21] Appl. No.: 207,516

[22] Filed: Apr. 21, 1994

Related U.S. Application Data

[60] Division of Ser. No. 880,256, May 8, 1992, abandoned, which is a continuation-in-part of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.[6] .................................................. G06K 7/10
[52] U.S. Cl. ........................... 235/462; 235/470; 359/197
[58] Field of Search ........................ 359/196, 197, 359/199, 202, 223, 206; 235/462, 467, 472, 470

[56] References Cited

U.S. PATENT DOCUMENTS

| | | |
|---|---|---|
| 1,202,446 | 10/1916 | Speed . |
| 1,552,186 | 9/1925 | Anderson . |
| 1,800,601 | 4/1931 | Centeno . |
| 1,873,926 | 8/1932 | Centeno . |
| 2,971,054 | 2/1961 | Holt, Jr. . |
| 2,989,643 | 6/1961 | Scanlon . |
| 3,087,373 | 4/1963 | Poor . |
| 3,532,408 | 10/1970 | Dostal . |
| 3,624,284 | 11/1971 | Russel ........................ 359/223 |
| 3,642,343 | 2/1972 | Tchejeyan et al. . |
| 3,981,566 | 9/1976 | Frank et al. . |
| 3,998,092 | 12/1976 | Maccabee . |
| 4,021,096 | 5/1977 | Dragt . |
| 4,175,832 | 11/1979 | Umeki et al. . |
| 4,199,219 | 4/1980 | Suzuki et al. . |
| 4,251,798 | 2/1981 | Swartz et al. . |
| 4,256,364 | 3/1981 | Minoura et al. . |
| 4,360,798 | 11/1982 | Swartz et al. . |
| 4,369,361 | 1/1983 | Swartz et al. . |
| 4,387,297 | 6/1983 | Swartz et al. . |
| 4,409,470 | 11/1983 | Shepard et al. . |
| 4,496,831 | 1/1985 | Swartz et al. . |
| 4,593,186 | 6/1986 | Swartz et al. . |
| 4,632,501 | 12/1986 | Glynn . |
| 4,705,365 | 11/1987 | Wakita et al. . |
| 4,732,440 | 3/1988 | Gadhok . |
| 4,816,661 | 3/1989 | Krichever et al. . |
| 4,871,904 | 10/1989 | Wells . |
| 4,919,500 | 4/1990 | Paulsen . |
| 4,974,918 | 12/1990 | DeLacue et al. . |
| 5,168,149 | 12/1992 | Dvorkis et al. ...................... 235/470 |
| 5,235,167 | 8/1993 | Dvorkis et al. ...................... 235/472 |
| 5,250,791 | 10/1993 | Heiman et al. ...................... 235/462 |
| 5,373,148 | 12/1994 | Dvorkis et al. ...................... 235/462 |

FOREIGN PATENT DOCUMENTS

| | | |
|---|---|---|
| 0471291A2 | 7/1991 | European Pat. Off. . |
| 471291 | 2/1992 | European Pat. Off. ............... 359/199 |
| 187886 | 7/1990 | Japan ..................................... 235/462 |

*Primary Examiner*—John Shepperd
*Attorney, Agent, or Firm*—Lowe, Price, LeBlanc & Becker

[57] ABSTRACT

A scanning arrangement in a scanner incorporating a scan element which is capable of the repetitive high-speed scanning of indicia having parts of different light reflectivity; for example, such as barcode symbols, and more particularly, pertains to the operation of a scanning arrangement of the type which, at high scanning speeds, will enable the scanning of indicia in variable and specified omni-directional scanning patterns. The variable omni-directional scanning pattern is attained through control over the electrical energy input to a read-start device for activating the scan element of the scanner for vibratory motion between first and second pairs of scan end position, in which the energy input is controlled and varied, and the scan element is rotated, in a manner so as to enable the scan element to implement the aforementioned omni-directional scanning patterns over the indicia.

44 Claims, 7 Drawing Sheets

PRESENTATION MODE $\alpha = \pm 30°$

PASS-THROUGH MODE

SCANNING ARRANGEMENT FOR THE IMPLEMENTATION OF SCANNING PATTERNS OVER INDICIA BY DRIVING THE SCANNING ELEMENTS IN DIFFERENT COMPONENT DIRECTIONS

This is a divisional application of U.S. patent application Ser. No. 07/880,256, which was filed on May 8, 1992 (now abandoned), which is a continuation-in-part of U.S. patent application Ser. No. 07/520,464, filed May 8, 1990 (now U.S. Pat. No. 5,168,149, issued Dec. 1, 1992), which is in turn a continuation-in-part of U.S. patent application Ser. No. 07/428,770, filed Oct. 30, 1989 (now U.S. Pat. No. 5,099,110). This application is also related to U.S. application Ser. No. 08/245,520, which is a continuation of application Ser. No. 07/880,256, now abandoned, and to U.S. application Ser. No. 08/108,521, which is a continuation of application Ser. No. 07/868,401, which issued as U.S. Pat. No. 5,280,165.

BACKGROUND OF THE INVENTION

1. Field of the Invention

The present invention relates, in general, to a scanning arrangement in a scanner and incorporating a scan element which is capable of the repetitive high-speed scanning of indicia having parts of different light reflectivity; for example, such as barcode symbols, and more particularly, pertains to the operation of a scanning arrangement of the type which, at high scanning speeds, will enable the scanning of indicia in variable and specified omni-directional scanning patterns.

In accordance with specific aspects, the invention is directed to the provision of novel scanning methods and apparatus for omni-directionally scanning indicia through the use of a single scan element, especially such as a resonant asymmetric scan element, operating in at least two different frequency modes creating a processing lissajous pattern so as to provide an at least ⅓ omni-directional scan of the indicia.

As contemplated pursuant to another aspect of the invention, the variable omni-directional scanning pattern is attained through control over the electrical energy input to a read-start device for activating the scan element of the scanner for vibratory motion between first and second pairs of scan end positions, in which the energy input is controlled and varied in a manner so as to enable the scan element to implement the aforementioned omni-directional scanning patterns over the indicia.

According to a specific feature of the invention, an omni-directional scanning pattern is realized in that a double lissajous pattern is implemented by a single scan element through the combining of a fast lissajous pattern with a slower lissajous pattern and periodically changing between the two lissajous patterns through control over the electrical energy input such that there is obtained an omni-directional scanning pattern without the necessity of having to utilize an additional motor in the scanning arrangement.

Additionally, as contemplated by another concept of the invention, the electrical energy input to the read-start means for imparting the vibratory movements to the scan element of the scanning arrangement causes the relative amplitudes between the different scanning directions of the scan element to be varied, such as in sinusoidal modes, so as to allow for decoding of indicia in any orientation which; in effect, will provide a full omni-directional scanning pattern to allow presentation in any orientation of the indicia.

The foregoing varying modes of scanning to attain the different and varying types of omni-directional scanning patterns is readily attained through the use of currently existent scanning devices, particularly such as by means of a resonant asymmetric scan element, through controlling the electrical energization frequency and/or intensity supplied to the read-start device for the scan element employed in the scanning arrangement.

The utilization of laser scanning devices for the scanning or reading of information provided on a target; such as a package or sale item, is well known in this particular technology and has found wide acceptance in commerce. In this connection, various types of laser scanning devices incorporate scanning heads which house optical reading systems, such as barcode readers, for the reading of information or barcode symbols on targets which are scanned by a laser beam projected from the barcode reader. In general, such laser scanning devices; especially those in the type of barcode readers, are widely employed in industry, such as manufacturing, shipping, and in retail commerce and; for example, may be permanently incorporated in the structures of check-out counters of supermarkets, whereby the items of merchandise having the barcode symbols imprinted thereon or applied thereto are passed over a fixed barcode reader located beneath the counter surface so as to provide a record for the merchant of the merchandise being purchased by a consumer, and concurrently a readout (and possibly a printed record) for the consumer.

Alternatively, the barcode reader or laser scanning device may also be constituted of an optical scanner unit which is fixedly mounted on a stand extending above a support platform or countertop on which the merchandise may be arranged; or in many instances of utilization, pursuant to a preferred embodiment of the invention, may be in the form of a miniature, lightweight and gun-shaped device having a pistol grip, and which the activated device is normally passed over the barcode symbol which is imprinted on a sale item or target at some short distance therefrom so as to enable scanning of the information provided by the barcode symbols.

2. Discussion of the Prior Art

Various optical readers and optical scanning systems have been developed heretofore for reading barcode symbols appearing on a label or on the surface of an article. The barcode symbol itself is a coded pattern of indicia comprises of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications, in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, the light beam or laser beam projected therefrom, at a target and a symbol which is to be read.

The light source in a laser scanner is typically a gas laser or semiconductor laser. The use of semiconductor devices, such as a laser diode, as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Barcode symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the barcode symbol is referred to as the density of the symbol. To encode a desired sequence of characters, a collection of element arrangements are concatenated together to form the complete barcode symbol, with each character of the message being represented by its own corresponding group of elements. In some symbologies a unique "start" and "stop" character is used to indicate where the barcode begins and ends. A number of different barcode symbologies exist. These symbologies include UPC/EAN, Code 39, Code 128, Codabar, and Interleaved 2 of 5.

For purpose of discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new barcode symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional barcodes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beam is directed by a lens or similar optical components along a light path toward a target that includes a barcode symbol on the surface. The scanning functions by repetitively scanning the light beam in a line or series of lines across the symbol. The scanning component may incorporate a drive or scanning motor adopted to either sweep the beam spot across the symbol and trace a scan line across and past the symbol in a high-speed repetitive mode, or scan the field of view of the scanner, or do both.

Scanning systems also normally include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading barcode symbols. Another type of barcode reader is one which incorporates detectors based upon charge coupled device (CCD) technology. In such readers, the size of the detector is larger than or substantially the same as the symbol which is to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

In essence, the invention is directed towards the provision of a scanner incorporating a rapidly oscillated scan element or mirror enabling the generation of omni-directional scanning patterns, preferably a resonance asymmetric scan element (RASE), wherein the scan element is preferably mounted on a vibratory set of components, such as a U-shaped spring of the scanning arrangement having a holder thereon grippingly engaging the upper side edges of the mirror. Preferably, although not necessarily, the fast or high frequency axis of rotation for the scan element or mirror on the vibratory component may coincide with the center of mass of the mirror so as to thereby reduce any vibratory stresses generated in the region of attachment of the mirror.

Pursuant to a specific feature of the invention, the vibration imparted to the components of the scanning arrangement through the intermediary of a read-start unit, consists of an electrically-energized magnet structure, incorporating a control device for varying the intensity of electrical energization or the frequency of the electrical energizing current applied to the read-start unit so as to generate varying types of omni-directional scanning patterns over an indicia which is being read by the scanner. Thus, in a particular instance, the control device for electrically energizing the read-start unit may impart operation in at least two modes to the single scan element so as to create a precessive lissajous scanning pattern which provides for an annular redundancy of the scan lines of a ⅓ omni-directional scan which can decode at least 33.3% of a 360° orientation, enabling the indicia, such as a barcode symbol, to deviate at angles relative to the scan direction of the scanner while being scanned in either a presentation or pass-through mode by the scanner.

Another inventive feature resides in that the energization of the read-start unit by the control device is adapted to generate a double-lissajous omni-directional scan in which the scan element, such as the resonant asymmetric scan element, has two available "Y" oscillatory frequencies at different orders of magnitude imparted thereonto; and also a torsional mode which imparts oscillation in the "Z" oscillatory directions, thereby combining the last-mentioned motion with alternatingly or periodically switching between the fast and slow "Y" oscillatory, there are produced two lissajous patterns so as to create an omni-directional scanning pattern.

The control device for the read-start unit may impart electrical energizing current to the read-start unit for the scan element in which the relative amplitudes between the "Y" and "Z" oscillating modes are continually varied, preferably sinusoidally, so as to allow decoding of the indicia being read in any orientation during this varying opening period in the scanning frequencies or amplitudes, thereby enabling the generating of a full omni-directional scanning pattern.

Accordingly, it is a primary object of the present invention to provide a novel and unique scanning arrangement in a scanner incorporating a control device for electrically energizing a read-start unit for imparting oscillatory movement to the scan element of the scanner at differing energizing levels and/or frequencies so as to generate controllably varying and specified omni-directional scanning patterns over an indicia being read by the scanner.

Another object of the present invention is to provide a scanning arrangement of the type described in which the control device for energizing the read-start unit enables generation of omni-directional scanning patterns in precessing and lissajous patterns so as to provide for a full ⅓ omni-directional scanning pattern as described herein.

Still another object of the present invention is to provide for a method of generating novel omni-directional scanning patterns utilizing the inventively energized scanning arrangement.

BRIEF DESCRIPTION OF THE DRAWINGS

Reference may now be had to the following detailed description of exemplary embodiments of the invention, taken in conjunction with the accompanying drawings; in which.

DETAILED DESCRIPTION OF PREFERRED EMBODIMENTS

Figure 1:
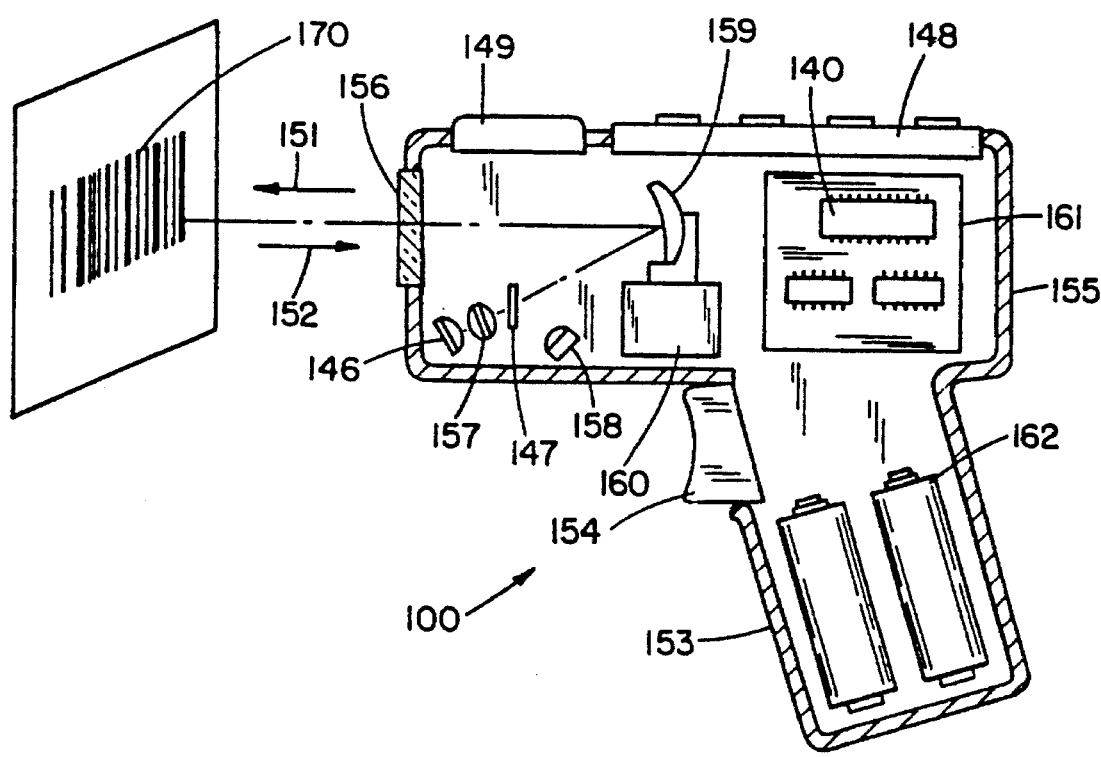
FIG. 1 illustrates a longitudinal sectional view through an exemplary embodiment of a laser scanning device adaptable for housing a scanning arrangement in accordance with the present invention and in which the scanning device is in the shape of a hand-held, gun-shaped component.

Referring in more specific detail to the drawings, as diagrammatically illustrated in FIG. 1, pursuant to a typical exemplary prior art embodiment adaptable for housing a scanning arrangement in accordance with the present invention, a laser scanning device may be a barcode reader unit 100 in a hand-held gun-shaped configuration, although obviously other kinds of configurations of scanners readily lend themselves to the invention, having a pistol-grip type of handle 153 and in which a movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a barcode symbol by the user from a position in which the reader 100 is spaced from the symbol, i.e., not touching the symbol or moving across the symbol. Typically, this type of hand-held barcode reader is specified to operate in the range of from contact with the symbol to distances of perhaps several inches or even further therefrom.

The reader 100 may also function as a portable computer terminal, and in such embodiments include a keyboard 148 and a display 149, such as described in the previously noted U.S. Pat. No. 4,409,470.

As further depicted in FIG. 1, a suitable lens 157 (or multiple lens system) may be used to focus the scanned beam into the barcode symbol at an appropriate reference plane. A light source 146, such as a semiconductor laser diode, is positioned to introduce a light beam into the axis of the lens 157, and the beam passes through a partially-silvered mirror 147 and other lenses or beam-shaping structure as needed, along with an oscillating mirror or scanning element 159 which is attached to a scanning motor 160 activated when the trigger 154 is pulled. If the light produced by the source 146 is not visible, an aiming light, if needed, produces a visible-light spot which may be fixed, or scanned just like the laser beam; the user employs this visible light to aim the reader unit at the symbol before pulling the trigger 154.

Figure 2:
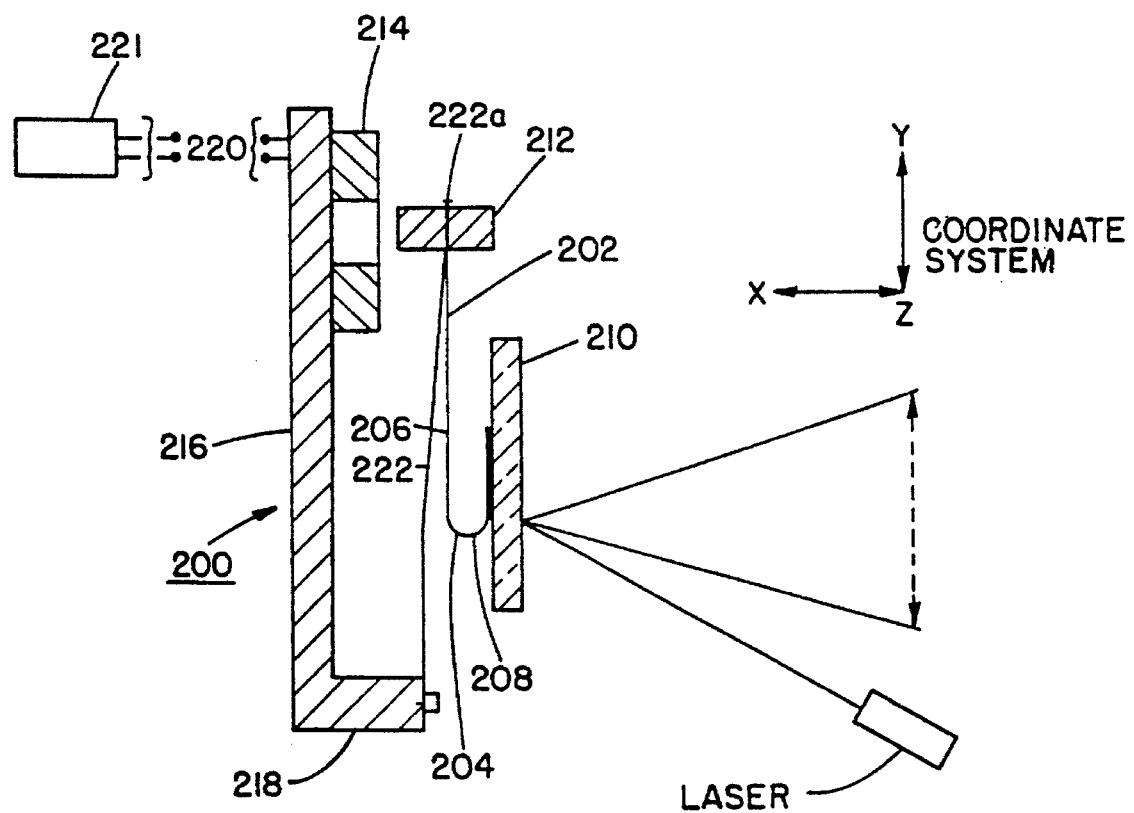
FIG. 2 illustrates a top-plan view through a typical scanning arrangement in accordance with the present invention.

As is illustrated in FIG. 2 of the drawings, which represents a top view of a typical scanning arrangement 200 for the implementation of a two-dimensional or two-axis scan pattern in accordance with the present invention, a holder 202 incorporates a U-shaped spring 204 having a pair of arms 206 and 208. A scan element 210, for example a light reflector or mirror, is fixedly mounted at the free end of the arm 208, while a permanent magnet 212 is mounted at the opposite free end of arm 206. An electromagnetic coil 214 is fixedly mounted on a support member 216, the latter of which is secured to a member 218, wherein these components 212 and 214 form a read-start unit for the scan element 210. Electrical input leads 220 from an electrical control device 221 supply an energizing signal to the electromagnetic coil 214. The arm 206 and the permanent magnet 212 are secured to a generally planar spring member 222 at one end 222a thereof, and which has its other end 222b secured to the base 218. The planar spring 222 may be made of any suitable flexible material, such as a leaf spring, a flexible metal foil, a flat bar. The U-shaped spring structure 204, 206, 208 may also be constituted from any suitable metallic material possessing resilient or flexibility properties; preferably a material such as a beryllium-copper alloy. The mass of the mirror 210 may be equal to the mass of the permanent magnet 212, and under certain instances may be much higher than the equivalent mass of the U-shaped spring 204. In either case the material mass on the mirror or right side of the planar spring will be greater than that on the other or left side of the planar spring. This difference in the mass causes a weight imbalance that results in a torsional bending or what is more commonly referred to as twisting of the planar spring 222. Due to this twisting a driving signal can be applied to the planar spring 222 to impart an angular oscillatory movement of the mirror 210 in the x-z plane for effecting a "Z" directional or vertical scan.

Such an arrangement has been previously described in my prior U.S. Pat. No. 5,168,149. In column 11, lines 1–31, of the '149 patent is described a way of obtaining an omni-directional scan pattern using the arrangement shown in FIG. 5 of the patent. Viewing FIG. 5 as a top plan view of the holder assembly, an omni-directional scan can be obtained because of the weight imbalance of the components with respect to planar spring, i.e., a greater mass will be on the right side of the spring than on the left side. When a driving signal is applied, this weight imbalance will result in a torsional vibration of planar spring causing a vertical or y-directional scan with the mirror moving in the z-y, not x-y as erroneously stated in the patent, plane and the u-shaped spring will vibrate in the x-z plane to effect a horizontal or x-directional scan. The driving signal can be applied in the manner described to obtain simultaneous vibration of the u-shaped spring to effect a scan in the horizontal direction and of the planar spring to effect a scan in the vertical direction, which results in combination in a two dimensional, omni-directional scan.

FIG. 2 of the present application similarly provides an assembly for obtaining a two dimensional, raster or omni-directional scan pattern. FIG. 2 is a top plan view of the holder assembly. A two dimensional, raster or omni-direction scan can be obtained because of the weight imbalance of the components with respect to planar spring 222, i.e., a greater mass will be on the right side of spring 222 than on the lest side. When a driving signal is applied, this weight imbalance will result in a torsional vibration of planar spring 222 causing a vertical or z-directional scan with the mirror moving in the z-x plane. The driving signal will also cause the u-shaped spring 204 to vibrate in x-y plane to effect a horizontal or y-directional scan. The driving signal can be applied in the manner described elsewhere to obtain simultaneous vibration of the u-shaped spring to effect a horizontal scan and torsional vibration of the planar spring to effect a vertical scan, which in combination will result in an omni-directional scan. A fast horizontal scan results from the vibration of the u-shaped spring while a slower vertical scan results from the torsional vibration of the planar spring.

Figure 7:
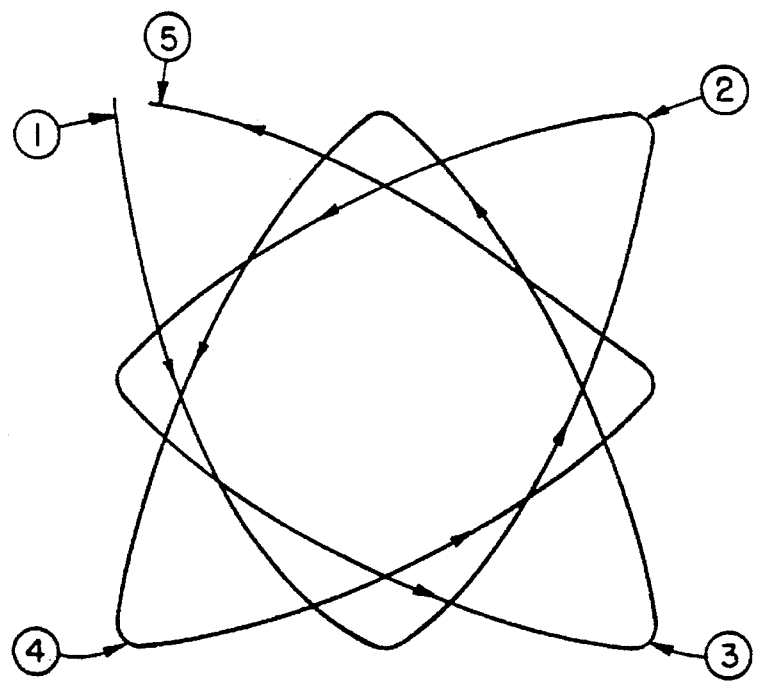
FIG. 7 illustrates an omni-directional scanning pattern attainable with the inventive scanning device.

It is perhaps worthwhile to point out that an omni-directional scan is one in which the target can be scanned at any angle to the emitted beam so long as the target is visible. As noted above, the FIG. 2 arrangement can provide either a raster or omni-directional type scan. The FIG. 2 configuration allows for dual frequency vibrations in the x-y plane which relates to a horizontal scan. Normally, the u-shaped spring is designed to vibrate at resonant frequency in the x-y plane, which is a relatively higher frequency, for example 400 Hz, than the frequency of vibration of the planar spring, which might be at 50 Hz. Additionally, by providing the proper forcing frequency the planar spring will vibrate torsionally about the y-axis which results in a vertical scan. By maintaining the torsional forcing frequency constant and varying the bending vibration forcing frequency between the natural frequencies of the two springs, the x-y plane vibrations, an omni-directional scan as shown in FIG. 7 will be obtained. The FIG. 3 embodiment can also produce an omni-directional scan using only a single forcing frequency in combination with assembly rotation.

As those skilled in the art will understand, the phrase "precessive mode" means that the scan pattern changes, at least slightly, with each scan. This is achieved by designing the vibrating assembly such that the resonant frequencies about the various axis of vibration are not integer multiples of each other. This results in a scan pattern being formed which will cover both the width and height of a symbol during multiple scan cycles. In order to obtain a raster-type scan pattern, the U-shaped spring 204 and the planar spring 222 vibrate in planes which are orthogonal to each other. As shown in the drawing, the arms of the U-shaped spring 204 will vibrate in the X-Y plane resulting in a horizontal scan and the planar spring 222 will vibrate in the X-Z plane resulting in a vertical scan. Through this arrangement of the holder structure 202, the mirror or scanner component 210 is mounted for angular oscillating movement, in first and second alternate circumferential directions, between first and second pairs of scan end positions. Moreover, due to their respective shapes and positioning, bending vibration of the U-shaped spring 204 will be within a high range of frequencies, typically of within 200 to 800 Hz, whereas the planar spring 222 will vibrate within a low range of frequencies, typically about 50 to 200 Hz. The amplitude of vibration necessary to scan the symbol will depend upon the size of the symbol and would typically be at least 10° to 30° optical. Increasing the angular amplitude as thus the scan line produced by the holder arrangement 202, as may be desirable for certain applications, may be readily attained by constructing the U-shaped spring 204 with the arms being asymmetrically dimensioned, in effect, of different lengths thereby producing a resonant asymmetric scan element. Thus, in a specific embodiment, the arm 208 may be shorter than the arm 206 by a ratio of at least 2:1, Thus, an asymmetrically dimensioned U-shaped spring will result in a longer Y direction scan line in a raster-type pattern.

In addition to increasing the angular amplitude, which can be as much as a 100% increase over a symmetrically dimensioned U-shaped spring, an asymmetrically dimensioned U-shaped spring provides a higher durability against metal fatigue and cracking since the nodal point is no longer located at a curved portion of the spring. This type of construction also provides the benefit of less vibration being transferred to the base, since the U-shaped spring is held only at the magnet end and the angular movement of the magnet can be a plurality of times lower than that of the scanning component or mirror 210.

Figure 3:
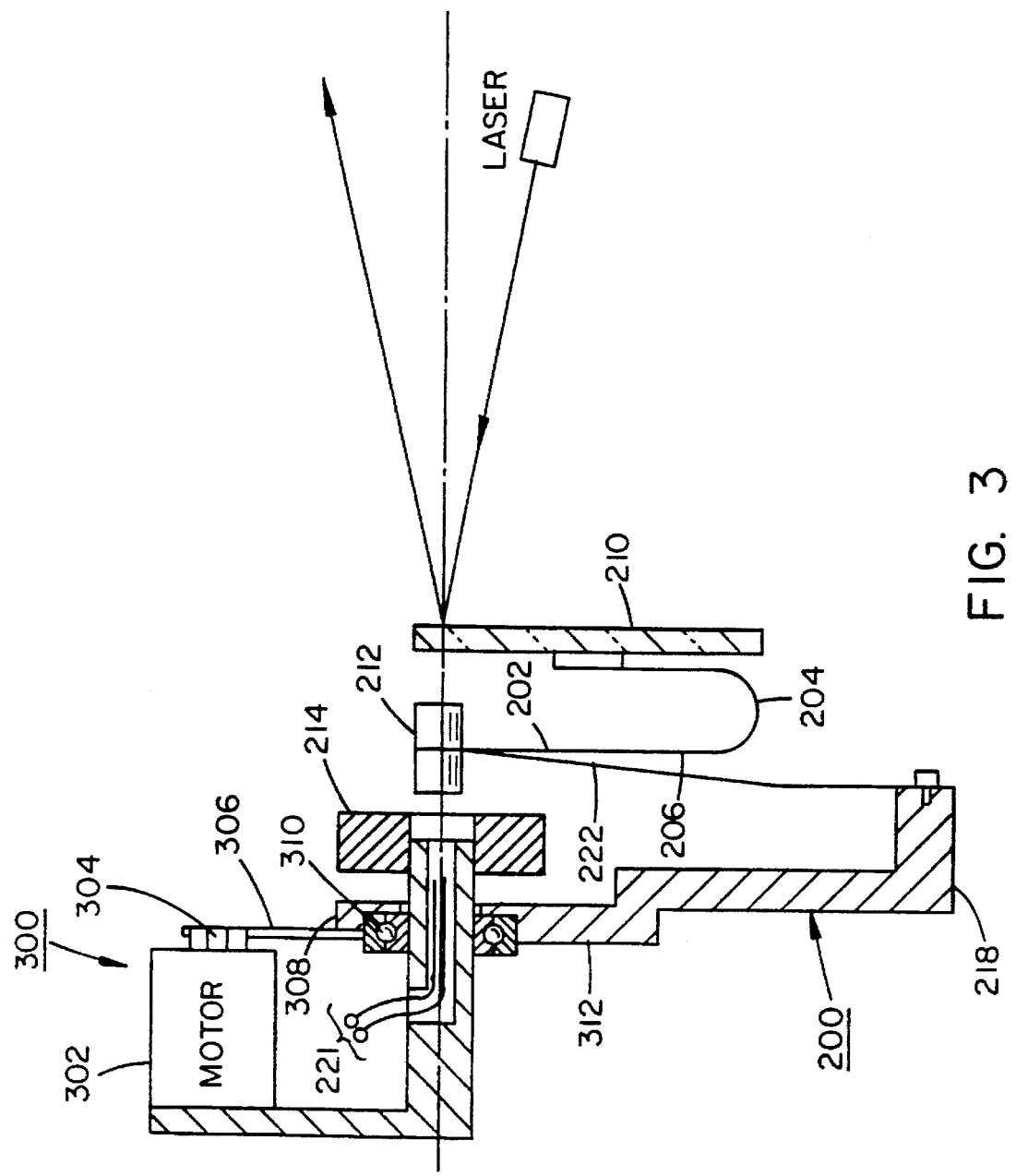
FIG. 3 illustrates a somewhat modified embodiment of the scanning arrangement of FIG. 2.

FIG. 3 shows another inside view configuration for producing an omni-directional or multi-directional scan pattern; which rotates the entire holder means about an axis. The arrangement shown in FIG. 3 is similar to that of FIG. 2 and like reference numerals are used to identify like parts and a description thereof is not repeated here for the sake of brevity. In order to rotate the entire scanning arrangement, component 300 shown in FIG. 3 is illustrative only, inasmuch as any suitable means for rotating the scanning arrangement 200 about an axis may be employed to effect an omni-directional scan pattern. The component 300 includes a motor 302 having a shaft 304 for driving a transmission belt 306. Belt 306 is coupled to a shaft (not shown) connected to the support 308 for rotating the support 308 about ball bearing 310 which is attached to support beam 312. The rotation of a single axis direction scan arrangement will produce an omni-directional scan pattern in the form of a rosette. The rotation of a two-axis scan arrangement will produce various other omni-directional scan patterns depending on the type of two-axis arrangement being rotated.

Reverting to FIGS. 4a, 4b and 5 through 7 of the drawings, there is illustrated an omni-directional scanning pattern which is attainable with scanners shown in FIGS. 2 and 3 of the drawings.

Thus, in each of the scanners of FIGS. 2 and 3, the control device 221 causes the read-start unit 212, 214 of each scanning arrangement to be energized at variable electrical current intensities and/or frequencies in order to provide specified omni-directional scanning patterns without the need for incorporating additional motors or other components in presently existing scanners of this type.

Figure 6A:
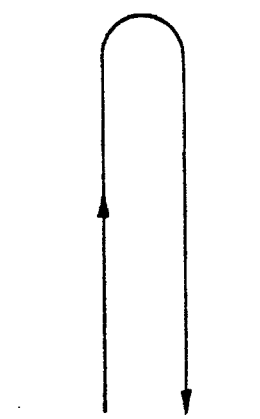
FIG. 6a and 6b illustrate, respectively, a presentation mode and pass-through mode for the raster scanning pattern of FIG. 4.
Figure 6B:
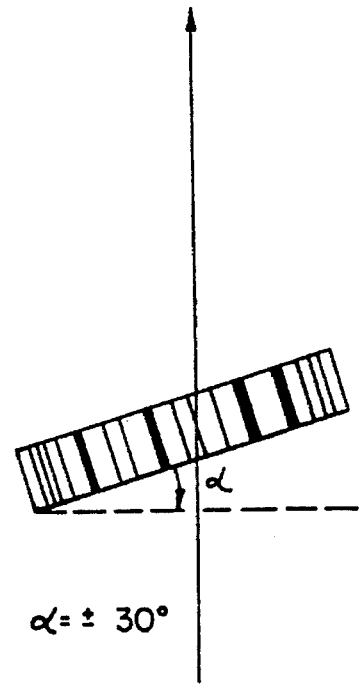

In a particular instance of utilization in which it is intended to obtain a ⅓ omni scan, whereby the scanning arrangement 200 can decode at least 33-⅓% of a 360° orientation of the indicia, a presentation mode as shown in FIG. 6a in which the scanning arrangement is passed across and then back over the indicia, or alternatively, a pass-through mode as shown in FIG. 6b in which the indicia, such as a barcode, is passed beneath a fixed scanning point at a specified linear speed of travel (for example, up to 30 in./sec. as long as the barcode orientation is ±30° around the preferred orientation thereof) can be used.

Figure 4A:
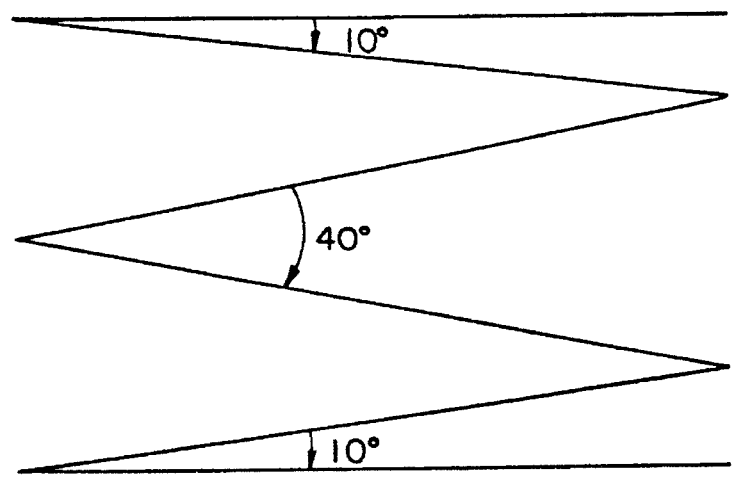
FIG. 4a and 4b illustrate an omni-directional scanning raster pattern attainable with the scanning arrangement of FIG. 2.
Figure 4B:
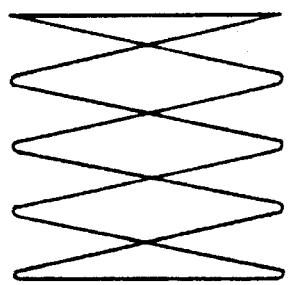
Figure 5:
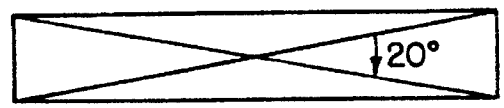
FIG. 5 illustrates an inherent orientation freedom for a typical barcode symbol.

Hereby, by way of example, there is employed a precessive lissajous scanning mode by the scanning arrangement 200 whereby, for example, a raster scanner at 600 scans/sec. and 100 frames/sec. would readily constitute a ⅓-omni scanning device allowing for ±30° freedom of orientation for the indicia, as shown in FIGS. 4a and 4b. In FIG. 4a there can be seen that the scanning pattern includes two parallel lines, two ±10° lines and two ±20° lines. Any symbol has an inherent orientation freedom. For example, the barcode having its width divided by its length, as shown in FIG. 5. Thus, for example, utilizing the oscillations in the "Y" direction at 300 Hz caused by the bending vibration of the U-shaped spring and "Z" direction of oscillation at 50 Hz resulting from the torsional vibration of the planar spring, a precessive mode, such as 3:1; 3.1:1; 3.2:1 etc., may be utilized to generate an overlapping omni-directional scanning pattern. Thus will enable the accurate and complete scanning of the symbol during either presentation or pass through modes while the symbol; i.e. barcode, is in angled scan orientation as shown relative to the scanning arrangement.

Hence, FIG. 4a shows the result of combined vibrations which cause a scan in two orthogonal directions. Such a scan pattern could be obtained using the arrangement shown in FIG. 2. The u-shaped spring normally vibrates at a higher rate than the flat spring. Noting that FIG. 2 is a top view of the spring arrangement, the FIG. 4a scan reflects, for example, a rate of vibration of the u-shaped spring of say 300 Hz and a rate of torsional vibration of the planar spring of say 50 Hz. Thus, the pattern of FIG. 4a can be obtained using the FIG. 2 arrangement by simultaneously applying the applicable forcing frequencies to cause the necessary oscillation of the u-shaped spring 204 and the planar spring 222 to produce a relatively fast horizontal scan vibration in the x-y plane and a relatively slow vertical scan in the x-z plane.

Figure 8:
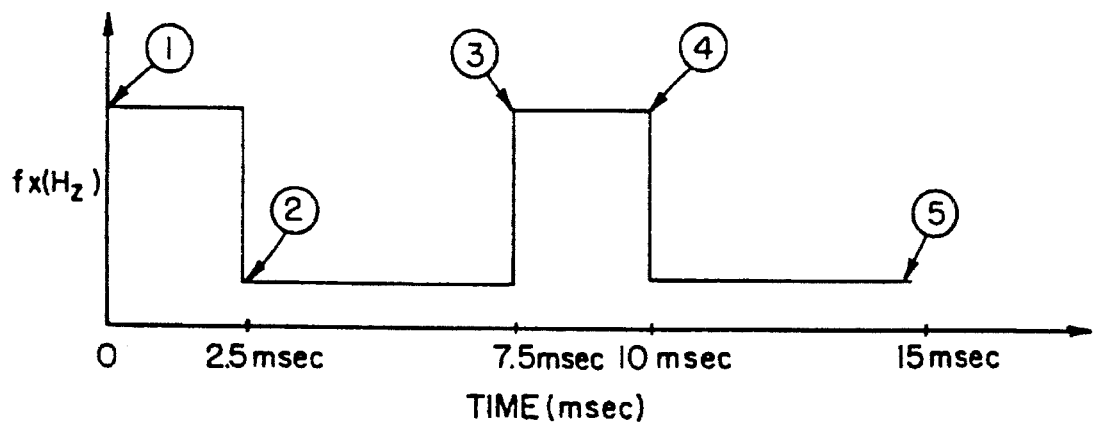
FIG. 8 illustrates a full scanning pattern with the energizing drive signal received from the control device by the read-start unit for the scan element.
Figure 9A:
FIGS. 9a through 9d illustrate an omni-directional scanning pattern obtained through the energization of the read-start unit with fluctuating the amplitude levels or the frequencies by means of the energizing control device.
Figure 9B:
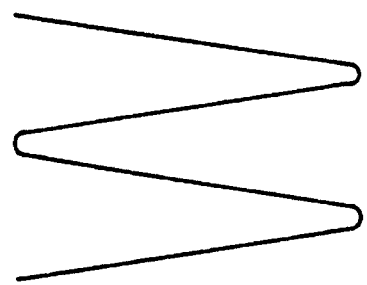
Figure 9C:
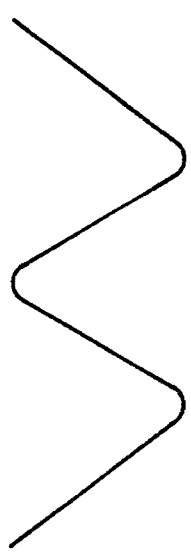
Figure 9D:

Reverting to the scanning mode as shown in FIGS. 7 and 8, FIG. 7 illustrates a star-shaped double lissajous omni-directional scanning pattern in which the star-shaped double-lissajous pattern is obtained by switching between a slow and a fast "Y" oscillation frequency for the scan element by alternating the signals driving bending vibration of the planar and U-shaped springs e.g. 100 to 400 Hz, at the enumerated four points indicated in FIG. 8 and conversely. The switching is performed over a period of time, such as 15 msec, while maintaining the "Z" oscillations by driving a constant torsional vibration of the planar spring at 200 Hz. Thus, the scan element, which may be an RASE, has two available "Y" oscillating frequencies introduced therein by the control element energizing the read-scan unit.

In essence, the scan element is operating at bending vibratory or oscillatory frequencies of 100 Hz or 400 Hz in the "Y" direction while "Z" is maintained at a torsional vibration or oscillating frequency of 200 Hz. Thus, by maintaining the "Z" oscillations constant while switching between the two "Y" scanning amplitudes or frequencies whereby one is high and one is low there are obtained two orthogonal 1:2 lissajous scanning patterns. This will provide the star-shaped double-lissajous pattern as shown in FIG. 7 of the drawings if the "Y" oscillations are switched exactly by a drive signal at the end of each cycle with the same phase, in essence, as shown at the points represented in FIG. 8 of the drawings.

Hereby, both the "Y"'s and the "Z" have to be self-resonance close feedback loops; in effect, a total of three loops; and inasmuch as each loop has its own feedback, these can be employed for the accurate switching needed to obtain a precise scanning pattern in a double-lissajous arrangement.

On the other hand, if the switching at the various points is not precisely accurate, this will result in a precessing pattern which can also provide for an advantageous scanning of the symbol.

It is also possible to utilize the foregoing energizing cycle with a precessing pattern, such that rather than obtaining a 1:2 or 1:3 ratio, a 1:2.1 etc. or 1:3.1 etc. can be obtained which, in the absence of accurate switching of the "Y" frequencies at the switching points in FIGS. 7 and 8, will provide a precessing scanning pattern enabling an advantageous reading of the indicia by the scanner.

As shown, pursuant to another mode of energization of the read-start unit by the control device, it is also possible to obtain the desired omni-directional scanning patterns shown in FIG. 9 of the drawings. The intensities in the current levels for producing the "Y" and "Z" oscillating of the scan elements may be varied, such as sinusoidally, so as to produce gradual changes in the relative amplitudes between the "Y" and "Z" oscillations, i.e. the oscillations respectively resulting from bending vibrations of either the planar or U-shaped springs and from the torsional vibration of the planar spring to permit for decoding in any orientation during the opening up-time, which may be over a period of 200 ms. From the foregoing, and as shown particularly in FIGS. 9a through 9d, the variation in the patterns will ensure that an indicia, such as a barcode signal, irrespective as to the orientation thereof will be fully scanned as a result of the varying intensity between "Y" and "Z".

Figure 10A:
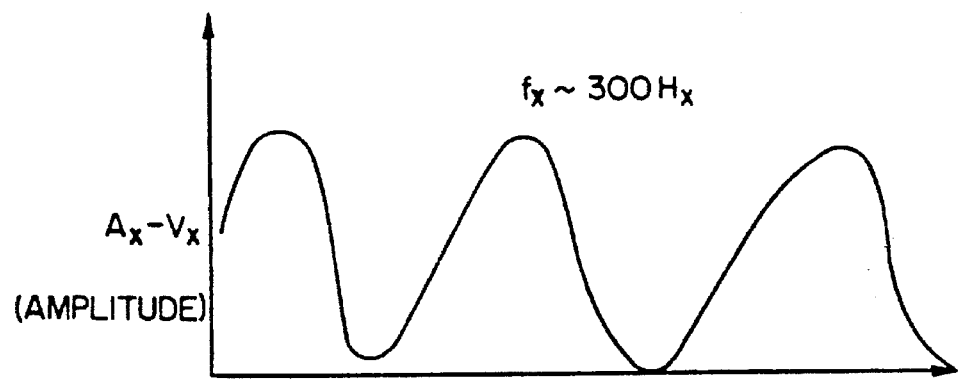
FIGS. 10a and 10b graphically illustrate the amplitude of the oscillations in the "Y" and "Z" planes of the scan element.
Figure 10B:
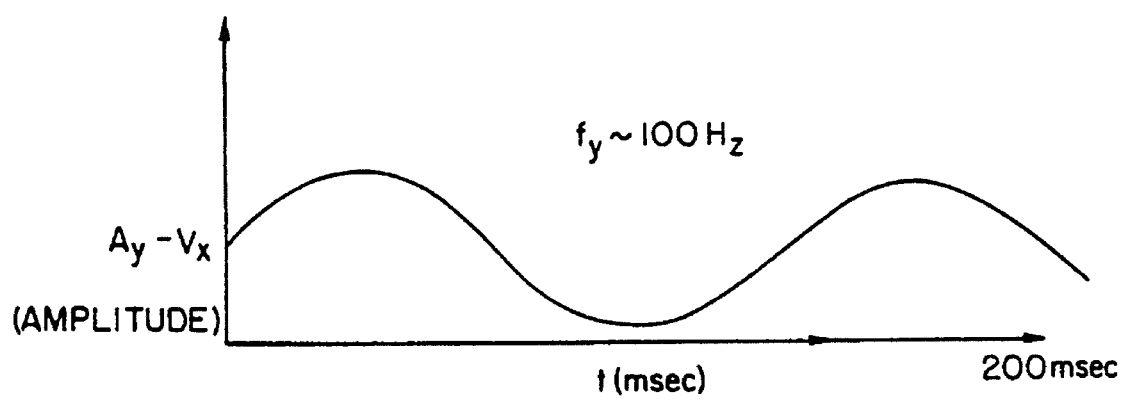

The particular full omni-directional scanning pattern which is obtained by varying the intensity of the energization of the read-start unit by the control device, in effect, by providing sinusoidal amplitudes for both the "Y" and "Z" oscillations, i.e. the oscillations respectively resulting from bending vibrations of either the planar or U-shaped springs and from the torsional vibration of the planar springs, of the scan element, and also by utilizing some rotational movement of the scan element as shown in the embodiment of FIG. 3 for the scanning device, will produce a full omni-directional pattern created by an integration of the scan amplitudes during the opening time, as shown in FIGS. 10a and 10b. This correlated change in the relative amplitudes of the "Z" and the "Y" oscillations permit for a decoding of a symbol in any orientation during the opening up-time of the cycle, which may extend through a time period of up to 200 msec.

The FIG. 7 scan pattern is achievable by precise varying of the frequencies and without rotating the springs. The resonant torsional or twist frequency of the planar spring is 200 Hz. The resonant bending frequencies of the planar and u-shaped springs are respectively 100 and 400 Hz. The coil supplies a constant resonant twist frequency of 200 Hz while simultaneously supplying a resonant bending frequency which is switched between 100 and 400 Hz. Because the resonant frequencies of the two springs for twisting and bending vibration are different, the superimposed frequencies drive only the particular spring which resonants at the driving frequency or frequencies. In the example given, there is no overlap of frequencies. The driving forces are at 100, 200 and 400 Hz. Those springs not having a natural frequency at a particular forcing frequency will not vibrate in response to that frequency. Thus, a spring with natural frequencies of 100 and 600 Hz will resonant at those frequencies and not at frequencies which are lower or higher. The springs are driven at resonant frequency.

The foregoing in a clear and accurate manner will enable the omni-directional scanning of indicia irrespective of orientations thereof deviating from the normal, and without having to utilize additional motor or drive components, by simply incorporating the control element 221 in existing scanner structures.

While there have been shown and described what are considered to be preferred embodiments of the invention, it will, of course, be understood that various modifications and changes in form or detail could readily be made without departing from the spirit of the invention. It is therefore intended that the invention not be limited to the exact form and detail herein shown and described, nor to anything less than the whole of the invention herein disclosed as hereinafter claimed.

What is claimed is:

1. A scanner for reading indicia having portions of differing light reflectivity; comprising:

means for directing a light beam from said scanner towards said indicia;

means for collecting reflected light returning from said indicia; and an arrangement for scanning the indicia with said light beam, said scanning arrangement comprising:

(i) a scanner component;

(ii) first and second vibratory means positioned (1) to support said scanner component for angular oscillatory movement in at least one direction; (2) to vibrate in at least one plane; and (3) to cooperate such that vibration of only the first vibratory means in one plane provides fast angular oscillating movement and vibration of only the second vibratory means in said one plane provides slow angular oscillating movement to said scanner component in one scan direction;

(iii) means for rotating said first and second vibratory means about a rotational axis simultaneously with said oscillating movement of the scanner component;

(iv) read-start means for moving said scanner component in said at least one scan direction to angularly oscillate said scanner component for directing the light beam in said at least one scan direction; and (v) control means operatively connected to said read-start means for imparting differing signals to said read-start means so as to cause said scanner component to implement varying operating modes to generate scan patterns over the indicia.

2. The arrangement as claimed in claim 1, wherein said scanning pattern over the indicia is omni-directional.

3. The arrangement as claimed in claim 1, wherein said scanner component facilities omni-directional scanning of said symbol in a presentation mode.

4. The arrangement as claimed in claim 1, wherein said scanner component facilitates omni-directional scanning of said symbol in a pass-through mode.

5. The arrangement as claimed in claim 1, wherein said control means for energizing said read-start means periodically alternates frequencies of signals to said read-start means so as to implement a double-lissajous omni-directional scanning pattern over the indicia.

6. The arrangement as claimed in claim 1, wherein said control means energizes said read-start so as to continually vary the amplitudes in the vibrations of said first and second vibratory means so as to generate a Lissajous onmi-directional scanning pattern of varying orientations relative to the indicia.

7. The arrangement as claimed in claim 1, wherein said control means for energizing said read-start means varies the intensity and frequency of electrical current supplied to said read-start means.

8. The arrangement as claimed in claim 1, wherein said first vibratory means comprises a U-shaped spring having a pair of arms, said scanner component being mounted at the free end of one of said arms.

9. The arrangement as claimed in claim 8, wherein said second vibratory means comprises a generally planar spring having one end secured to the end of the other arm of said U-shaped spring and the other end secured to a base.

10. The arrangement claimed in claim 9, wherein said read-start means includes an electrically-operated actuator responsive to actuation thereof for vibrating said first and second vibratory means to angularly oscillate said component in the one scan direction, said actuator including an electromagnetic coil having a passage, and a magnet mounted on the first and second vibratory means and movable towards and away from the passage during actuation of said coil.

11. The arrangement as claimed in claim 10, wherein said magnet is mounted on said first and second vibratory means proximate the juncture between said one end of the planar spring and said other arm of said U-shaped spring.

12. The arrangement as claimed in claim 8, wherein the arms of said U-shaped spring are asymmetrically dimensioned.

13. The arrangement as claimed in claim 12, wherein said U-shaped spring is formed from a bent leaf spring.

14. The arrangement as claimed in claim 1, wherein said indicia is a barcode symbol and said scanner is a barcode reader.

15. A method for reading indicia having portions of differing light reflectivity; comprising:

directing a light beam from a scanner component of a scanner towards the indicia;

collecting reflected light returning from the indicia;

driving a first and a second vibratory members to angularly oscillate in at least one plane to scan said light beam in at least one scan direction;

imparting differing signals to alternately drive said first and said second vibratory members said at different respective drive frequencies said to angularly oscillate scanner component in one plane so as to cause said scanner component to implement varying operating modes to generate scan patterns over the indicia; and rotating said scanner component about a rotational axis simultaneously with the driving of the scanner component.

16. A method as claimed in claim 15, wherein said differing signals are electrical signals which vary in intensity and frequency.

17. A method as claimed in claim 15, wherein said scanning pattern over the indicia is omni-directional.

18. A method as claimed in claim 15, wherein said scanner component facilitates omni-directional scanning of said symbol in a presentation mode.

19. A method as claimed in claim 15, wherein said scanner component facilitates omni-directional scanning of said symbol in a pass-through mode.

20. A method as claimed in claim 15, wherein said differing signals are periodically alternated signals of different frequency which drive said first and said second vibratory member so that the scanner component implement, a double-lissajous omni-directional scanning pattern over the indicia.

21. A method as claimed in claim 15, wherein said differing signals are continually varying signals of different amplitude which drive the first and second vibratory means such that angular oscillations of said scanner component thereby generate a lissajous omni-directional scanning pattern of varying orientations relative to the indicia.

22. A scanner for reading indicia having portions of differing light reflectivity; comprising:

means for directing a light beam from said scanner towards said indicia;

means for collecting reflected light returning from said indicia; and an arrangement for scanning the indicia with said light beam, said scanning arrangement comprising:

(i) a scanner component;

(ii) first and second vibratory means positioned (1) to support said scanner component for angular oscillatory movement; (2) to vibrate in first and second orthogonal planes; and (3) to cooperate such that vibration in the first orthogonal plane of only the first vibratory means provides fast angular oscillating movement and of only the second vibratory means provides slow angular oscillating movement to said scanner component in a first scan direction and vibration of only said second vibratory means in the second orthogonal plane provides angular oscillating movement to said scanner component in a second scan direction;

(iii) means for rotating said first and second vibratory means about a rotational axis;

(iv) read-start means for simultaneously moving said scanner component in said first scan direction and said second scan direction to simultaneously angularly oscillate said scanner component for directing the light beam in said first and second scan directions; and (v) control means operatively connected to said read-start means for imparting differing signals to said read-start means so as to cause said scanner component to implement varying operating modes to generate scan patterns over the indicia.

23. The arrangement as claimed in claim 22, wherein said scanner component facilitates omnidirectional type scanning of said symbol in a pass-through mode.

24. The arrangement as claimed in claim 22, wherein said control means for said read-start means causes said scanning component to implement a omni-directional scanning pattern over the indicia.

25. The arrangement as claimed in claim 22, wherein said scanner component facilitates omnidirectional type scanning of said symbol in a presentation mode.

26. The arrangement as claimed in claim 22, wherein said control means for energizing said read-start means periodically alternates input frequencies to said read-start means for angular oscillation of said scan component in said first scan direction so as to implement a double-lissajous omni-directional scanning pattern over the indicia.

27. The arrangement as claimed in claim 22, wherein said control means energizes said read-start means so as to continually vary the amplitudes in the vibrations of said first and second vibratory means so as to generate a Lissajous omni-directional scanning pattern of varying orientations relative to the indicia.

28. The arrangement as claimed in claim 22, wherein said control means for energizing said read-start means varies the intensity and frequency of electrical current supplied to said read-start means.

29. The arrangement as claimed in claim 22, wherein said first vibratory means comprises a U-shaped spring having a pair of arms, said scanner component being mounted to the free end of one of said arms.

30. The arrangement as claimed in claim 29, wherein said second vibratory means comprises a generally planar spring having one end secured to the end of the other arm of said U-shaped spring and the other end secured to a base.

31. The arrangement as claimed in claim 30, wherein said read-start means includes an electrically-operated actuator responsive to actuation thereof for vibrating said first and second vibratory means to angularly oscillate said component in the first and the second scan directions, said actuator including an electromagnetic coil having a passage, and a magnet mounted on the first and the second vibratory means movable towards and away from the passage during actuation of said coil.

32. The arrangement as claimed in claim 31, wherein said magnet is mounted on said first and second vibratory means proximate the juncture between said one end of the planar spring and said other arm of said U-shaped spring.

33. The arrangement as claimed in claim 29, wherein the arms of said U-shaped spring are asymmetrically dimensioned.

34. The arrangement as claimed in claim 33, wherein said U-shaped spring is formed from a bent leaf spring.

35. The arrangement as claimed in claim 22, wherein said indicia is a barcode symbol and said scanner is a barcode reader.

36. The arrangement as claimed in claim 22, wherein said first vibratory means is configured to vibrate at a high range of frequencies and said second vibratory means is configured to vibrate at a low range of frequencies in response to alternately applied driving signals to said read-start means by said control means, wherein one of said drive signals has a frequency within said high range and another of said drive signals has a frequency within said low range.

37. A method for reading indicia having portions of differing light reflectivity with a scanner comprising the steps of:

directing a flight beam from said scanner towards said indicia;

collecting reflected light returning from said indicia; and scanning the indicia with said light beam by angularly oscillating said scanner in two orthogonal planes to cause simultaneous scanning of said light beam in first and second orthogonal scan directions such that the scanning of the light beam in the first orthogonal scan direction is faster than the scanning of the light beam in the second orthogonal scan direction; wherein said scanning is electrically actuated;

rotating said scanner about a rotational axis simultaneously with the angular oscillating of the scanner; and controlling the scanning by imparting differing operating signals to implement varying operating modes to generate a scan pattern over the indicia.

38. A method as claimed in claim 37, wherein said controlling causes said scanning to implement a omni-directional scanning pattern over the indicia.

39. A method as claimed in claim 37, wherein said scanner facilitates omni-directional scanning of said symbol in a presentation mode.

40. A method as claimed in claim 37, wherein said scanner facilitates omni-directional scanning of said symbol in a pass-through mode.

41. A method as claimed in claim 37, wherein said controlling periodically alternates said signals so as to implement a double-Lissajous omni-directional scanning pattern over the indicia.

42. A method as claimed in claim 37, wherein said controlling continually varies amplitudes in the angular oscillation of said scanner to thereby generate a Lissajous omni-directional scanning pattern of varying orientations relative to the indicia.

43. A method as claimed in claim 37, wherein controlling varies an intensity and frequency of electrical current for driving the angular oscillation of the scanner.

44. The method as claimed in claim 37, wherein said controlling of the scanning includes imparting at least one signal having a frequency within a high range and at least one other signal having a frequency within a low range causing said angular oscillation of the scanner in one of said orthogonal planes to alternate between a high frequency and a low frequency to thereby effect a scan pattern over the indicia.

* * * * *